Jan. 5, 1937. W. T. YOST 2,066,507
COMBINED TOASTER AND GRILL
Filed Feb. 28, 1936
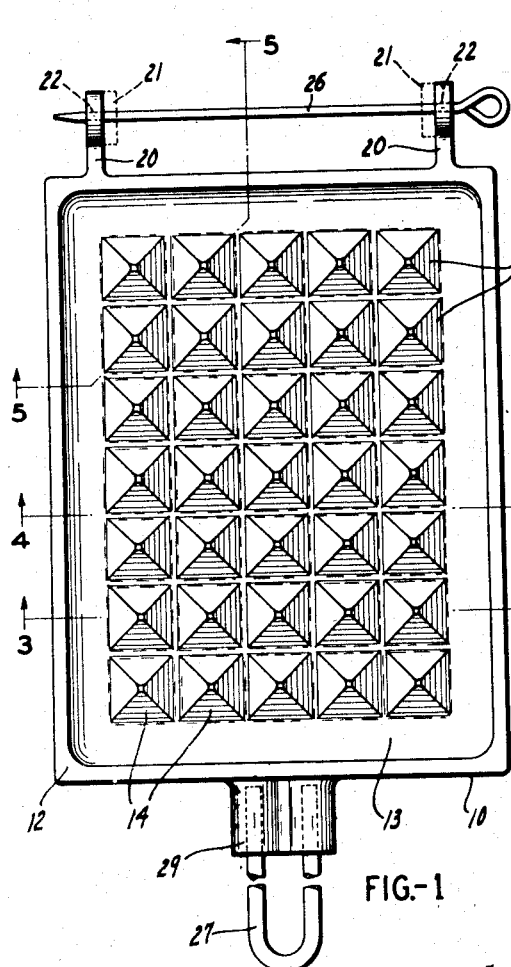
FIG.-1
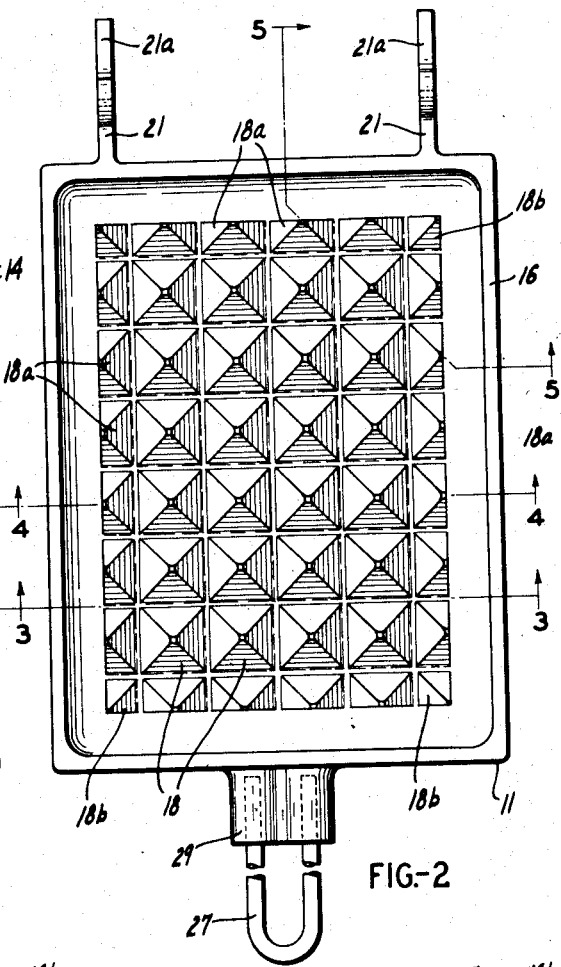
FIG.-2
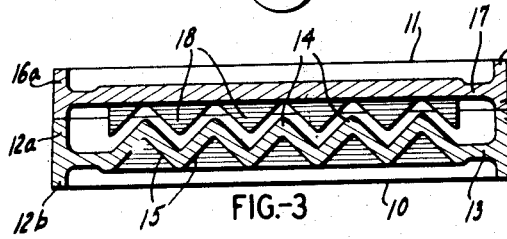
FIG.-3
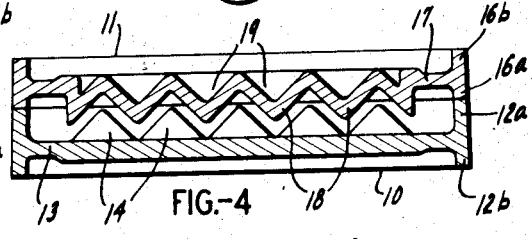
FIG.-4
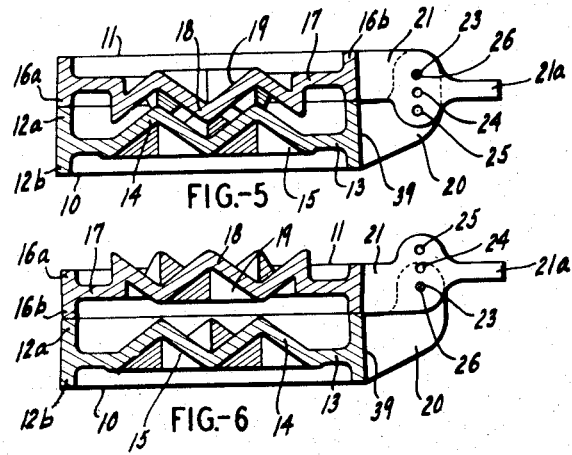
FIG.-5
FIG.-6
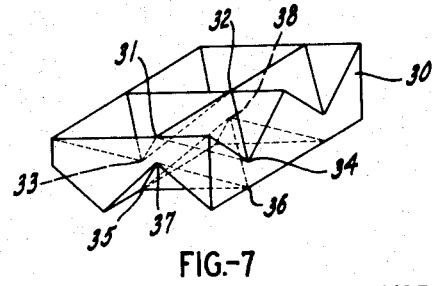
FIG.-7
INVENTOR
WILLIAM T. YOST
BY Brockett, Hyde, Higley & Meyer
ATTORNEYS Patented Jan. 5, 1937

2,066,507

UNITED STATES PATENT OFFICE 2,066,507

COMBINED TOASTER AND GRILL

William T. Yost, Cleveland, Ohio, assignor to The Kit-Ap Corporation, Cleveland, Ohio, a corporation of Ohio Application February 28, 1936, Serial No. 66,154

7 Claims. (Cl. 53—5)

This invention relates to a combined toaster and grill.

My invention provides a cooking utensil of the type in which two plates hingedly connected together are provided with mutually facing projections which are adapted to coact in a novel manner when the plates are brought together in a predetermined relation to cook material placed between them.

I am aware that many cooking utensils are commonly used for purposes similar to my improved device but my device differs from these prior utensils in that it applies a novel cooking idea because of the novel manner in which the projections coact with each other and with the material being treated between them.

One object of the present invention is to provide in a device of the class described mutually coacting projections on two plates which when in cooking position on the material to be treated between them provide a plurality of small portions of the material being cooked bounded by the faces of the projections and each portion sealed about substantially its entire periphery by the material being cooked which is compressed at these points by coacting portions of the plate projections. It results from this arrangement that each of the portions of the material being cooked is for practical purposes in a small pressure cooker and the heat supplied through the plates when the utensil is in use has both a direct heating effect and, by the generation of steam in the small individual units, gives a steam pressure cooking effect so that the individual portions of material are each thoroughly cooked in an extremely short time with novel results both as to taste and chemical composition of the material cooked.

My invention provides a particular form of mating plates well adapted to produce the unusual results described in the preceding paragraph.

My invention also provides a novel arrangement of the handles of the mating plates arranged in a manner to indicate when the utensil is at the desired operating temperature.

My invention also provides other numerous advantages including a special arrangement of a hinge connection between two plates of a utensil of the class described, a balancing of the plates about their centers and the provision of plates of substantially equal weight for the two mating members of the utensil and other advantages which will appear from the accompanying drawing, together with the description.

In the drawing, Figs. 1 and 2 are plan views of a pair of plates adapted to coact when placed together in a cooking operation; Figs. 3, 4 and 5 are sections taken along similarly numbered lines of Figs. 1 and 2 but with the upper surfaces of Figs. 1 and 2 placed together in coacting relationship; Fig. 6 is a section taken in a position similar to Fig. 5 but with the lower surface of the plate of Fig. 2 placed in coacting position adjacent the upper surface of the plate illustrated in Fig. 1; while Fig. 7 is a diagrammatic view of the matrix formed by material processed between the plates of Figs. 1 and 2 when in the mating position of Figs. 3, 4 and 5.

The structure described herein, comprising mutually coacting projections on a pair of mating plates taking advantage of the new cooking principle set forth, is adapted for use in utensils of various sizes and in which the plates are brought together in the predetermined cooking position in any suitable manner. However, for purposes of illustration I have shown a combined toaster and grill of a size adapted to accommodate a little more than a slice of bread of usual size and the two plates are hingedly connected together but my invention is not limited to a utensil made in exactly this manner.

My invention is illustrated as embodied in plates having mutually facing pyramidal projections adapted to form a matrix between them which takes advantage of the novel cooking principle disclosed herewith. However, I do not desire to be limited in the practice of my invention to projections only of the form shown but desire to utilize other forms of mating projections which provide a matrix using my novel cooking principle as defined by the appended claims.

In the device shown, a pair of plates 10 and 11 are provided which may be formed in any suitable manner but I find that aluminum castings serve the purpose very well. The plates shown are approximately 5 inches wide and 6½ inches long so that they accommodate any usual size of bread slice very nicely. The plate 10 has an upstanding flange 12 about its periphery which extends in both directions as shown at 12a and 12b from the general plane of the web 13. The web 13 is perfectly plain adjacent the upstanding flange 12a which provides an annular margin about a rectangular surface located centrally of the plate. This rectangular surface is provided with a continuously repeated series of projections 14 arranged in equally spaced rows running each direction of the plate at right angles to each other. Each of these projections is a regular rectangular pyramid, the base of which in the form shown is a square. These rows of pyramids end with a full pyramid at the edges of that portion of the plate which is provided with projections. The reverse side of plate 10 is shown in the sections of Figs. 3, 4 and 5 and preferably provides depressions 15 back of each of the projections 14 open toward the rear of the plate providing hollow projections of which the walls are relatively thin and of substantially equal thickness throughout the area of the plate as illustrated in the sections.

The plate 11 is similar in most respects to the plate 10, that is to say, it is provided with a peripheral flange 16 which extends in both directions from the general plane of the web portion 17 of the plate as shown at 16a and 16b. Within the flange portion 16a is a portion of the plain web surface extending about the periphery of the plate and equal in extent to the plain portion of plate 10 adjacent the flange 12 which leaves a rectangular central portion on plate 11 similar to the central portion of plate 10 and which carries projections 18 adapted to coact with the projections 14 of plate 10 during a cooking operation. The projections on plate 11 comprise half pyramid projections at 18a along the four sides of the central portion of the plate with quarter pyramid shaped projections at the corners 18b. The rest of the projections on plate 11 are full pyramids of substantially the same size and shape as the projections 14 of plate 10. Preferably also the reverse side of plate 11 shown in Fig. 2 is hollowed out to provide depressions 19 behind each of the projections 18 so as to provide hollow projections of substantially equal wall thickness to those of plate 10.

The means provided for insuring the opening and closing of the plates in proper position for cooking material between them is the hinge connection provided between the brackets 20 of plate 10 and the brackets 21 of plate 11. In the brackets 20 I provide a single hinge pin bearing 22 while the brackets 21 are provided with a plurality of hinge pin bearings 23, 24 and 25 spaced apart in a direction normal to the general plane of the plates 10 and 11 and a hinge pin 26 is passed through the openings or bearings 22 and through either set of bearings in the bracket portions 21 depending upon the spacing desired between the plates 10 and 11 in the cooking operation. As illustrated in Fig. 5, they are in position to handle material substantially the thickness of a single slice of bread, whereas when the pin is in the bearings 24 it is suitable to handle a sandwich of two slices of bread, and in the bearings 25 is adapted for a three-decker sandwich.

Any suitable means might be provided for maintaining the plates in properly spaced position during a cooking operation, but in the form shown the mating edges 12a and 16a of the peripheral flanges of the plates serve to space the plates the proper distance apart during the cooking operation and at the same time form a substantially tight seal extending continuously around the peripheral edges of the plates.

Each of the plates in the embodiment shown is provided with a handle 27 secured to that edge of the plate opposite the hinge connection by a heat conducting connection. For instance, the handle 27 may be of steel wire cast into position in the portion 29 of the plate member or the handle might be secured to the plate by other suitable connections. I prefer however to arrange these handles so that the end of the handle farthest from the plates when grasped by the hand is of a temperature adapted to bite but not burn the hand when the plates are at proper operating temperature. By the term "bite" I indicate a considerable warmth which is quite apparent to the hand but is somewhat short of a burning temperature. A suitable dimension of handle as shown in Figs. 1 and 2 is formed of a double length of steel wire of substantially $\frac{3}{16}$ inch diameter measuring approximately 7½ inches from the point where it emerges from the casting to the end of the handle.

I have illustrated diagrammatically in Fig. 7 the matrix formed between the plates of Figs. 1 and 2 when placed with the pyramid projections extending toward each other as illustrated in Figs. 3, 4 and 5. This matrix 30 will serve to illustrate the cooking principle involved between the pair of plates when so placed. By the reference numerals 31 to 38 inclusive I have designated the points substantially delimiting the boundaries of one of the plurality of small portions of food material which are formed between the mating projections just described. When the plates 10 and 11 are in the position illustrated in Figs. 3, 4 and 5, 37 and 38 show the position of the vertexes of two adjacent pyramidal projections 14, while 33 and 34 show the position of the vertexes of two pyramidal projections 18. When the plates are in a horizontal position the vertexes 37 and 38 lie vertically below the points 31 and 32 respectively which are the corners of the bases of the pyramidal projections whose vertexes are shown at 33 and 34. Likewise the vertexes 33 and 34 lie vertically above the points 35 and 36 which are the corners of the bases of the pyramids whose vertexes are shown at 37 and 38. The limiting surfaces about the portion of food thus defined comprise the triangular shaped surfaces 31—32—33 and 31—32—34 on the upper plate and the triangular surfaces 35—36—37 and 35—36—38 on the lower plate. This leaves exposed portions of material of substantially uniform thickness between four corresponding sides of the food portion. These corresponding sides are 31—33 and 37—35, 33—32 and 35—38, 32—34 and 38—36, 34—31 and 36—37. In the particular embodiment shown the space between these corresponding edges is approximately $\frac{1}{32}$ of an inch but I do not desire to limit myself to exactly this dimension. Note that throughout the coacting portions of the plates provided with projections there is provided a plurality of portions of food divided off exactly as the portions delimited by the reference characters 31 to 38 inclusive. Each of these portions is of exactly the same size and shape and each is in a separate oven unit, as I have called it, by itself. The best results are obtained when the material being cooked between the plates is so compressed between the coacting corner edges of the pyramidal projections of the two plates as to prevent effective flow of vapor and steam from one individual food portion to another. This occurs, for instance, in the making of toast if a fairly thick slice of bread is compressed between the plates in the position of Figs. 3, 4 and 5, whereupon the bread is compressed between the edge corners of the pyramids of the upper and lower plates to form for all practical purposes a small steam pressure cooker unit as illustrated by the described portions 31 to 38.

It results from the peculiar mating characteristics of the coacting projections just above described that when the plates are heated over a burner to the proper temperature and a slice of bread or other food material is then placed between the plates and held over the source of heat for the necessary length of time, heat is directly transmitted to each of the individual portions of food through the four triangular shaped surfaces directly in contact therewith and the steam generated in each of these small portions is substantially confined therein because of the compressed food material about the exposed periphery of the portion so that the combined conducted heat and steam causes a very rapid cooking action in each small food portion. It results from this steam cooking action in the case of starchy material, such as bread, that a toast is formed which is dextrinized or ovenized, that is to say, the starches and sugars are chemically transformed giving a cooked product of superior taste and of special body building properties.

When the parts are proportioned as illustrated, the distance between the planes of the lines 31—32 and 35—36 is substantially ½ inch so that no part of the small individual food portion is more than ¼ inch from a heated surface and most of the food is much closer than this to a heated surface.

By forming the projections hollow or open on the rear side which is exposed to the heat, I provide a heating surface substantially 1¾ times the area of a flat plate of the same outside dimensions. By providing walls of substantially equal thickness for the pyramidal projections and slightly thicker at the vertexes thereof, I produce a very uniform heating effect upon the food material treated.

With the plates arranged as shown I provide two plates of equal weight of metal. This is advantageous in that it balances the device and it provides equal heat storage capacity in the two plates.

I have arranged the hinge connection between the plates so that a matrix of a different form than that shown in Figs. 3, 4, 5 and 7 may be produced. In Fig. 6 I show the plate 10 in the same position as before but the plate 11 has been reversed so that the pyramidal projections 18 extend upwardly instead of downwardly. To this end the bearing 23 is placed in position to coact with the hinge bearing 22 in either of the two positions of plate 11 shown in Figs. 5 and 6. In this position of the parts shown in Fig. 6 the flange portions 16b meet the flange portions 12a and form a meeting and sealing arrangement about the entire periphery of the meeting plates.

I have provided portions 21a on the bracket members 21 so that they contact the portion 39 of the flange 12 so as to hold the upper plate in a convenient open position.

Material is cooked in my utensil when utilized in the position shown in Figs. 3, 4, 5, and 7 in an unbelievably short time. For instance, toast may be made in a total time of 6 to 12 seconds or a sandwich comprising two slices of bread with 1/16 pound of hamburger between them may be processed into a sandwich toasted on both sides and with the meat totally cooked in a total elapsed time of 1½ to 2 minutes.

What I claim is:

1. In a grill, a pair of coacting plate members, each having a plurality of regular rectangular pyramid projections contiguous in two directions, a hinge connection between said members, and the vertexes of the projections of one member lying opposite the base corners of the projections of the other member when said members are moved into juxtaposition about said hinge connection.

2. In a grill, a pair of coacting plate members, each having a plurality of regular rectangular pyramid projections contiguous in two directions, a hinge connection between said members, and the vertexes of the projections of one member lying opposite the base corners of the projections of the other member when said members are moved into juxtaposition about said hinge connection, there being portions of said members arranged to contact when said members are in juxtaposition in a manner to hold said vertexes of the projections of said one member spaced from said base corners of the projections of said other member.

3. In a grill, a pair of coacting plate members, each having a plurality of regular rectangular pyramid projections contiguous in two directions, a hinge connection between said members, and the vertexes of the projections of one member lying opposite the base corners of the projections of the other member when said members are moved into juxtaposition about said hinge connection, there being peripheral flanges about each of said members and having continuous edges adapted to meet when said members are in juxtaposition, said flanges being of a depth to hold said vertexes of the projections of said one member spaced from said base corners of the projections of said other member.

4. In a grill, a pair of coacting plate members, each having a plurality of regular rectangular pyramid projections contiguous in two directions, a hinge connection between said members, and the vertexes of the projections of one member lying opposite the base corners of the projections of the other member when said members are moved into juxtapositon about said hinge connection, there being an edge plate portion surrounding the projections of each member, said edge plate portion being substantially at the level of the base of said projections, and an upstanding flange about the periphery of each edge plate portion, said flanges being of a depth to hold said vertexes of the projections of said one member spaced from said base corners of the projections of said other member.

5. In a grill, a pair of mutually facing plate members hingedly connected together, each of said members having a plurality of regular rectangular pyramid projections arranged contiguously in rows at right angles to each other, the rows being equally spaced on each member and the vertexes of the projections of one member lying opposite the base corners of the projections of the other member when said members are moved into juxtaposition about said hinge connection, there being portions of said members arranged to contact each other when said members are in juxtaposition in a manner to hold said vertexes just out of contact with said base corners, and there being depressions on the outer sides of said plates behind said projections to provide thin walls for said projections of substantially uniform thickness.

6. In a combined grill and toaster, a pair of plates having mutually facing projections for gripping and heating material placed between them, said plates being of a size and shape to accommodate a slice of bread between them, and a hinge connection between said plates at one edge thereof, said connection comprising a separable hinge pin and a plurality of hinge pin bearings in said plates, said bearings being spaced in a direction normal to the general plane of said plates, whereby said pin may be shifted in said bearings to accommodate a plurality of bread slices between said plates, and a handle rigid with each of said plates extending in the general direction of the plane of said plates from the edge thereof opposite said hinge connection.

7. In a grill, a pair of cast aluminum plates hingedly connected and having mutually facing projections for gripping and heating material placed between them when said plates are held adjacent a heat source, at least one of said plates having depressions on its outer side, and said hinge connection being reversible whereby said depressions on the outer side of one of said plates may be turned toward the projections of the other plate to provide a second type of matrix between said plates.

WILLIAM T. YOST.